United States Patent
Kawanishi et al.

(10) Patent No.: US 9,766,353 B2
(45) Date of Patent: Sep. 19, 2017

(54) SCINTILLATOR, RADIATION DETECTION UNIT, AND METHOD OF MANUFACTURING SCINTILLATOR

(71) Applicant: Sony Corporation, Tokyo (JP)

(72) Inventors: Mitsuhiro Kawanishi, Tokyo (JP); Takahiro Igarashi, Kanagawa (JP); Shinichi Oguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/423,854

(22) PCT Filed: Jul. 31, 2013

(86) PCT No.: PCT/JP2013/004646
§ 371 (c)(1),
(2) Date: Feb. 25, 2015

(87) PCT Pub. No.: WO2014/038126
PCT Pub. Date: Mar. 13, 2014

(65) Prior Publication Data
US 2015/0185337 A1  Jul. 2, 2015

(30) Foreign Application Priority Data

Sep. 4, 2012 (JP) .................... 2012-194233

(51) Int. Cl.
*G01T 1/20* (2006.01)
*G01T 1/203* (2006.01)
(Continued)

(52) U.S. Cl.
CPC ............ *G01T 1/2033* (2013.01); *C09K 11/02* (2013.01); *C09K 11/06* (2013.01); *C09K 11/584* (2013.01);
(Continued)

(58) Field of Classification Search
CPC ....... C09K 11/02; C09K 11/06; C09K 11/584; C09K 11/7771; C09K 2211/1408;
(Continued)

(56) References Cited

U.S. PATENT DOCUMENTS 3,792,308 A * 2/1974 Ota .................... G02F 1/167
  313/506
3,891,852 A * 6/1975 Bollen ................ C09K 11/777
  250/390.02

(Continued)

FOREIGN PATENT DOCUMENTS

EP  0170533     2/1986
JP  06168784 A * 6/1994
(Continued)

OTHER PUBLICATIONS

International Search Report issued in connection with International Patent Application No. PCT/JP2013/004646, Dec. 18, 2013. ( 4 pages).

*Primary Examiner* — Kiho Kim
(74) *Attorney, Agent, or Firm* — Chip Law Group

(57) ABSTRACT

Provided is a scintillator that includes: first phosphors each including an inorganic fluorescent compound; and a second phosphor including a fluorescent resin.

19 Claims, 6 Drawing Sheets

(51) Int. Cl.
*C09K 11/02* (2006.01)
*C09K 11/06* (2006.01)
*C09K 11/58* (2006.01)
*C09K 11/77* (2006.01)

(52) U.S. Cl.
CPC .......... *C09K 11/7771* (2013.01); *G01T 1/203* (2013.01); *G01T 1/2018* (2013.01); *C09K 2211/1408* (2013.01); *C09K 2211/1416* (2013.01)

(58) Field of Classification Search
CPC ............ C09K 2211/1416; C09K 11/00; G01T 1/2018; G01T 1/203; G01T 1/1603; G01T 1/2033; G01T 1/20; G01T 3/06
USPC ....................................................... 250/367
See application file for complete search history.

(56) References Cited

U.S. PATENT DOCUMENTS

| | | | | |
|---|---|---|---|---|
| 3,898,460 A * | 8/1975 | Noakes | ................... | G01T 1/202 250/328 |
| 3,960,756 A * | 6/1976 | Noakes | ................... | G01T 1/202 250/367 |
| 4,143,297 A * | 3/1979 | Fischer | .................. | H05B 33/12 313/502 |
| 4,316,817 A * | 2/1982 | Cusano | .................. | C09K 11/02 250/483.1 |
| 4,486,486 A * | 12/1984 | Maeoka | .................... | G21K 4/00 250/483.1 |
| 4,495,084 A | 1/1985 | Shimizu et al. | | |
| 4,713,198 A * | 12/1987 | Simonetti | ............... | G01T 1/203 250/361 R |
| 4,800,136 A * | 1/1989 | Arakawa | .................. | G21K 4/00 250/484.4 |
| 5,110,500 A * | 5/1992 | Walker | ................... | G01T 1/203 252/301.16 |
| 6,180,949 B1 * | 1/2001 | Leblans | ............. | C09K 11/7733 250/370.11 |
| 6,476,552 B1 * | 11/2002 | Yoneda | .................. | H05B 33/22 313/506 |
| 6,884,994 B2 * | 4/2005 | Simonetti | ............. | G01T 1/2033 250/269.4 |
| 7,053,380 B2 * | 5/2006 | Homma | ................ | G01T 1/2018 250/367 |
| 9,337,401 B2 * | 5/2016 | Lee | ........................ | H01L 33/56 |
| 2005/0017189 A1 * | 1/2005 | Homma | ................ | G01T 1/2018 250/370.11 |
| 2005/0208290 A1 * | 9/2005 | Patel | ...................... | C09K 11/06 428/323 |
| 2005/0274916 A1 * | 12/2005 | Shoji | ........................ | B32B 3/00 250/580 |
| 2006/0033031 A1 | 2/2006 | Takeda et al. | | |
| 2006/0226759 A1 * | 10/2006 | Masuda | ............. | C09K 11/0883 313/486 |
| 2007/0114447 A1 * | 5/2007 | Shoji | .................. | C09K 11/7771 250/483.1 |
| 2008/0171229 A1 * | 7/2008 | Comanzo | ............. | C09K 11/665 428/702 |
| 2008/0231170 A1 * | 9/2008 | Masato | ................ | C09K 11/565 313/501 |
| 2008/0245968 A1 * | 10/2008 | Tredwell | ............... | G01T 1/2018 250/370.09 |
| 2008/0287583 A1 * | 11/2008 | Mataki | .................... | C07F 5/003 524/403 |
| 2010/0092769 A1 * | 4/2010 | Shoji | ......................... | G01T 1/00 428/337 |
| 2011/0198505 A1 * | 8/2011 | Ishida | ..................... | G01T 1/202 250/363.01 |
| 2012/0018761 A1 * | 1/2012 | Honda | ............... | C09K 11/7774 257/98 |
| 2012/0205543 A1 * | 8/2012 | Nakatsugawa | ......... | G01T 1/242 250/366 |
| 2012/0205544 A1 * | 8/2012 | Nakatsugawa | ......... | G01T 1/242 250/367 |
| 2012/0235046 A1 * | 9/2012 | Nakamura | ............. | G01T 1/203 250/361 R |
| 2013/0048865 A1 * | 2/2013 | Nishino | ............ | H01L 27/14663 250/366 |
| 2013/0048866 A1 * | 2/2013 | Nishino | ................ | G01T 1/2018 250/366 |
| 2014/0138590 A1 * | 5/2014 | Wani | .................... | C09K 11/584 252/519.4 |

FOREIGN PATENT DOCUMENTS

| | | | |
|---|---|---|---|
| JP | 2002-116300 | 4/2002 | |
| KR | 100826396 B1 * | 5/2008 | ............. H01L 33/44 |

* cited by examiner

[Fig. 1]
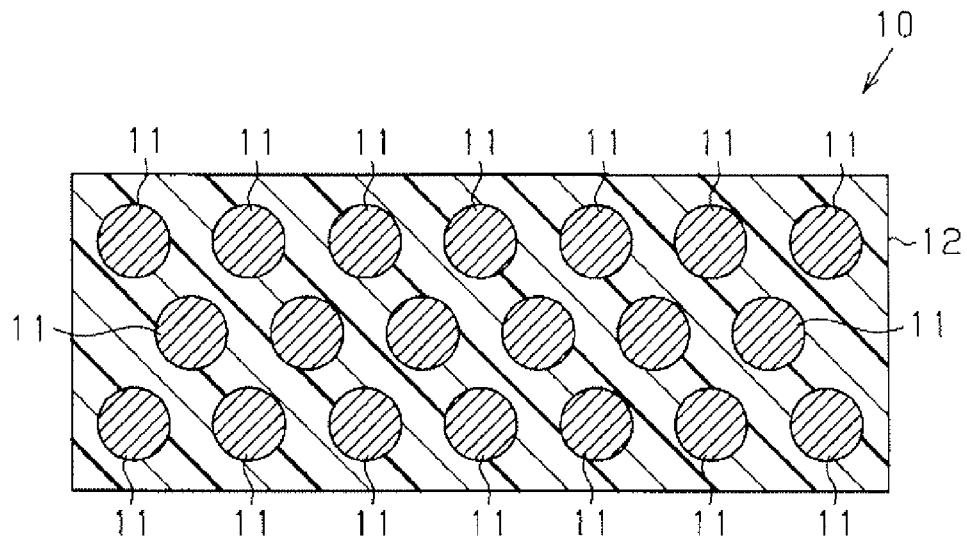
[Fig. 2]
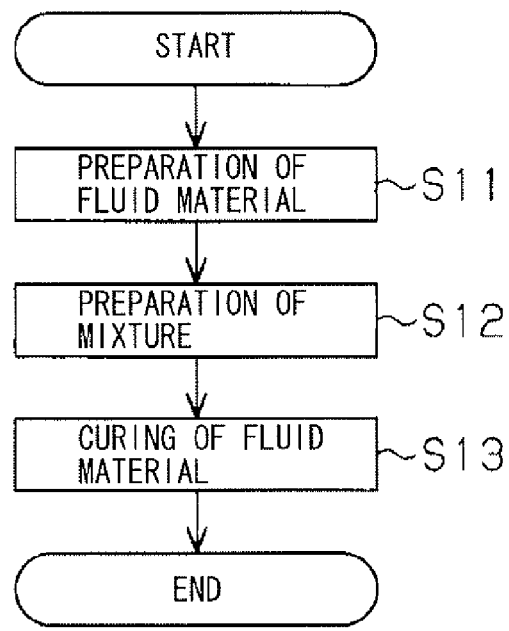

[Fig. 3]
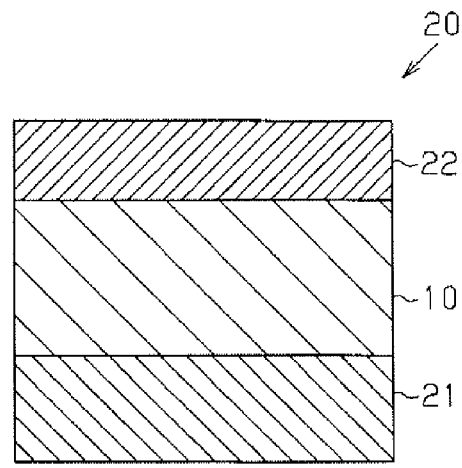
[Fig. 4]
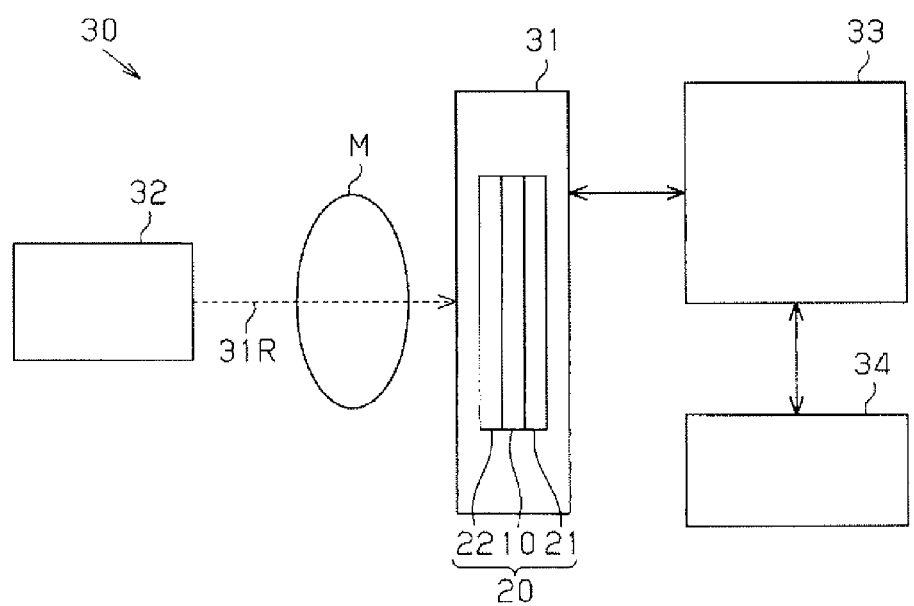

[Fig. 5]
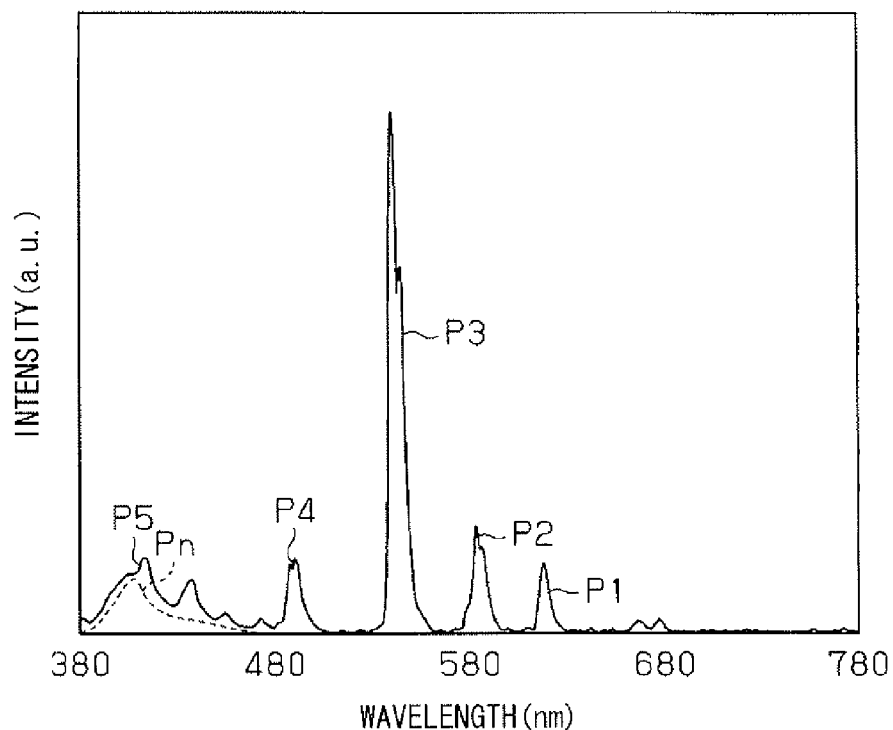
[Fig. 6]
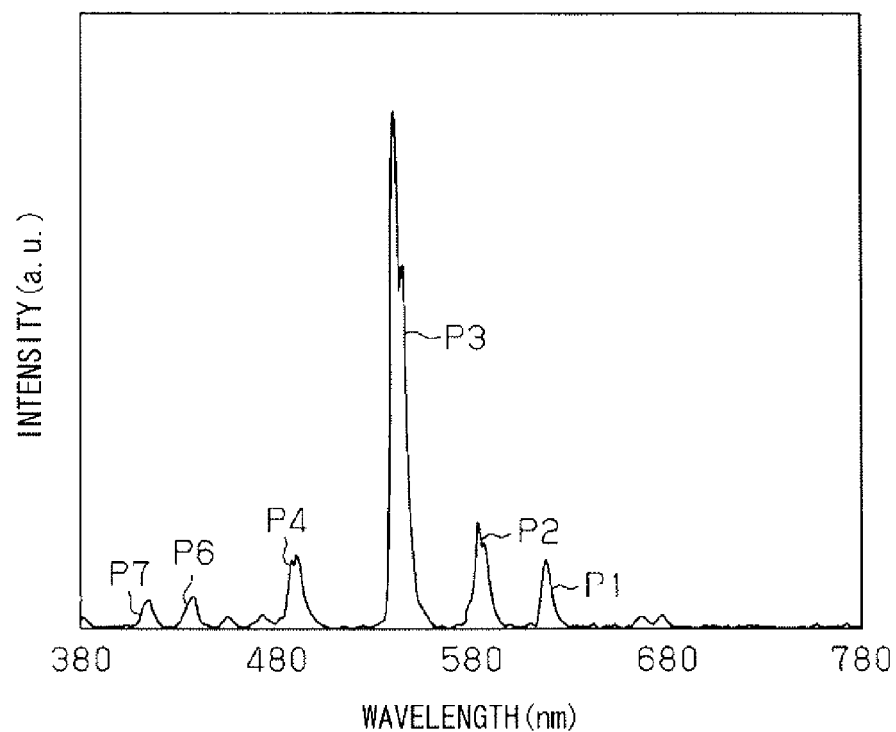

[Fig. 7]
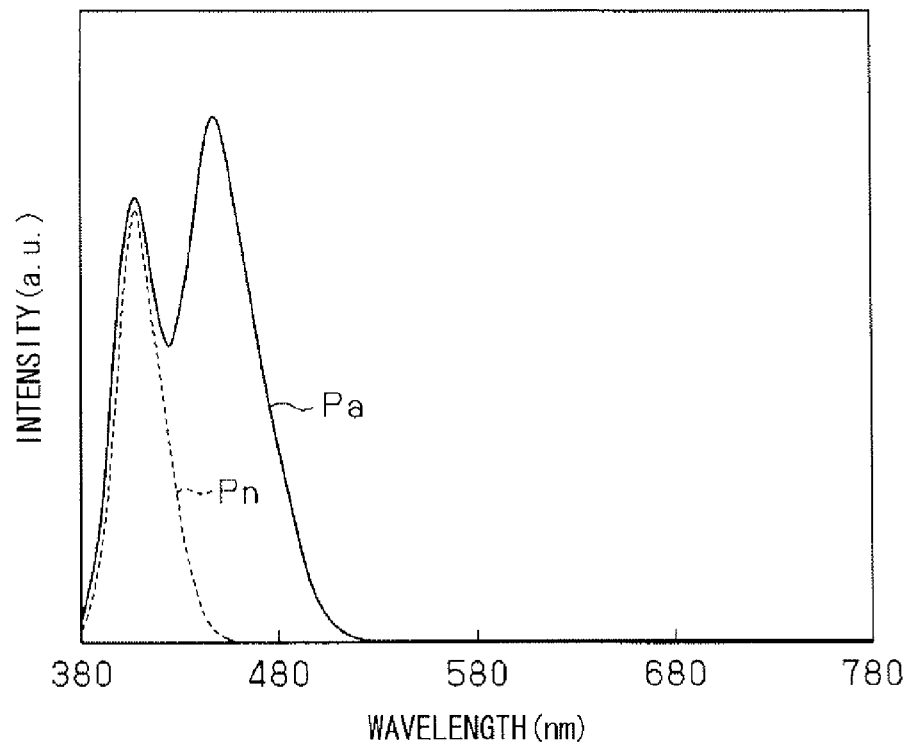
[Fig. 8]
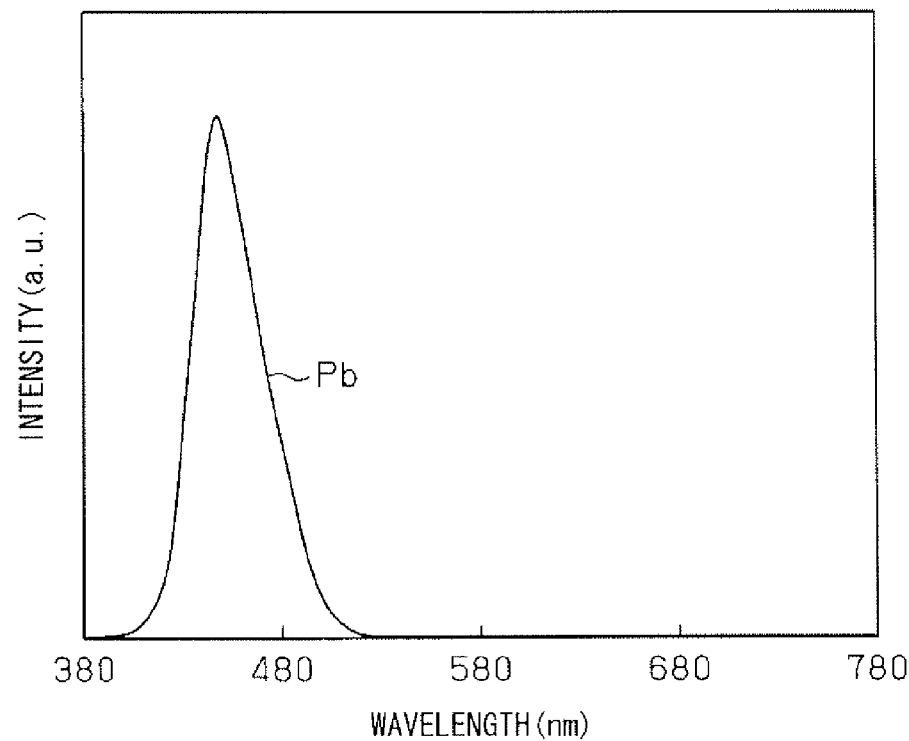

[Fig. 9]
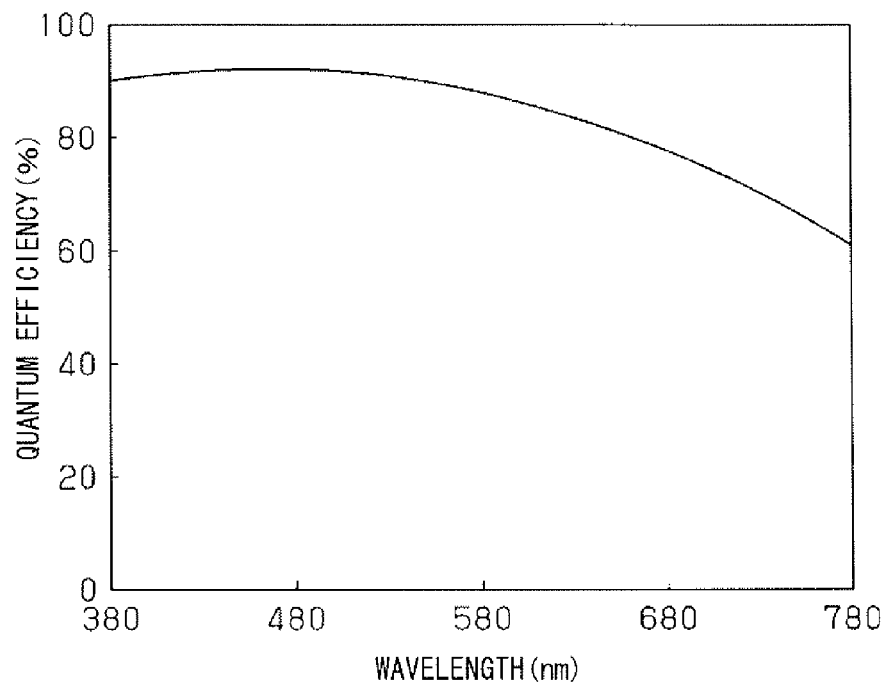
[Fig. 10]
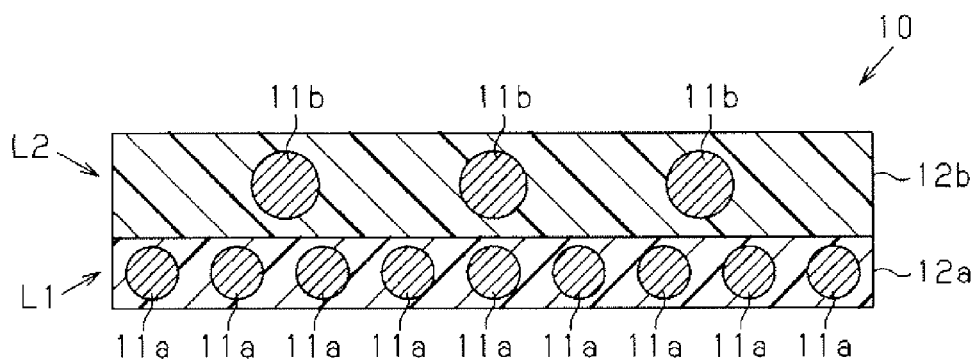

[Fig. 11]
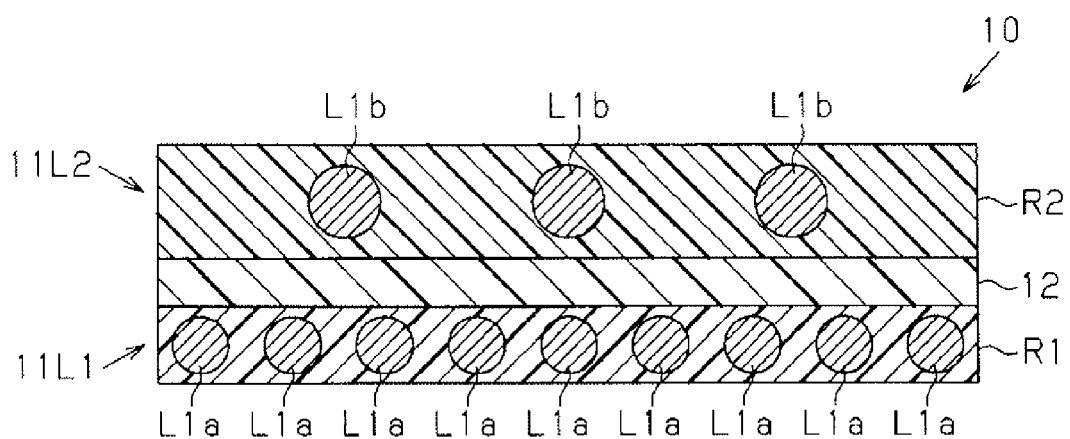

SCINTILLATOR, RADIATION DETECTION UNIT, AND METHOD OF MANUFACTURING SCINTILLATOR

CROSS REFERENCES TO RELATED APPLICATIONS

The present application is a national stage of International Application No. PCT/JP2013/004646 filed on Jul. 31, 2013 and claims priority to Japanese Patent Application No. 2012-194233 filed on Sep. 4, 2012, the disclosure of which is incorporated herein by reference.

BACKGROUND

The technology according to the present disclosure relates to a scintillator including an inorganic fluorescent compound, a radiation detection unit, and a method of manufacturing the scintillator.

The radiation detection unit that detects radiation has been used for diagnosis in a medical field or nondestructive inspection in an industrial field. Detection values of the radiation detection unit vary depending on luminance of light emitted from a scintillator. For example, a luminescent substance that emits light in the scintillator may be an inorganic fluorescent compound that emits visible or ultraviolet light in response to radiation impinging thereon, as described in PTL 1.

CITATION LIST

Patent Literature

PTL 1: JP 2002-116300A

SUMMARY

Technical Problem

In the radiation detection unit, radiation detection accuracy is improved as the scintillator emits light with higher luminance. It is therefore desired that the scintillator emits light with higher luminance.

It is desirable to provide a scintillator, a radiation detection unit, and a method of manufacturing the scintillator capable of increasing luminance of light.

Solution to Problem

According to an embodiment of the technology of the present disclosure, there is provided a scintillator, including: first phosphors each including an inorganic fluorescent compound; and a second phosphor including a fluorescent resin.

According to an embodiment of the technology of the present disclosure, there is provided a radiation detection unit, including: a scintillator including first phosphors and a second phosphor, the first phosphors each including an inorganic fluorescent compound, and the second phosphor including a fluorescent resin; and a photoelectric conversion component.

According to an embodiment of the technology of the present disclosure, there is provided a method of manufacturing a scintillator, the method including: mixing first phosphors with a second phosphor, the first phosphors each including an inorganic fluorescent compound, and the second phosphor including a fluorescent resin; and curing the second phosphor.

Advantageous Effects of Invention

According to the above-described respective embodiments of the technology of the present disclosure, the scintillator includes the first phosphors each including the inorganic fluorescent compound and the second phosphor including the fluorescent resin. Hence, the second phosphor emits fluorescent light in spaces between the first phosphors. The second phosphor therefore increases luminance of light in the spaces between the first phosphors. This results in an increase in luminance of light emitted by the scintillator.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

FIG. 1 is a cross-sectional diagram illustrating a sectional structure of a scintillator according to one embodiment that embodies the technology of the present disclosure.

FIG. 2 is a manufacturing process flowchart illustrating a process sequence in a method of manufacturing the scintillator in one embodiment.

FIG. 3 is a cross-sectional diagram illustrating a sectional structure of a radiation detection section in one embodiment.

FIG. 4 is a block diagram illustrating a configuration of a radiation detection unit in one embodiment.

FIG. 5 is a graph illustrating an emission spectrum of a scintillator according to Example 1.

FIG. 6 is a graph illustrating an emission spectrum of a scintillator according to comparative example 1.

FIG. 7 is a graph illustrating an emission spectrum of a scintillator according to Example 2.

FIG. 8 is a graph illustrating an emission spectrum of a scintillator according to comparative example 2.

FIG. 9 is a graph illustrating an exemplary absorption spectrum of a photoelectric conversion component.

FIG. 10 is a cross-sectional diagram illustrating a sectional structure of a scintillator according to a first Modification.

FIG. 11 is a cross-sectional diagram illustrating a sectional structure of a scintillator according to a second Modification.

DETAILED DESCRIPTION

An embodiment that embodies the technology according to the present disclosure will be described with reference to FIGS. 1 to 4.

(Scintillator)

As illustrated in FIG. 1, a scintillator 10 includes a plurality of first phosphors 11. The first phosphors 11 are bound to one another by a second phosphor 12. The scintillator 10 may be a plate-like scintillator that may be used as a scintillator plate in a radiation detection unit. The scintillator 10 may also be used as an intensifying screen attached to a cassette as a radiation detection medium. The scintillator 10 may also be singly used as a radiation detection body.

Each first phosphor 11 includes a structure including an inorganic fluorescent compound that emits fluorescent light in response to radiation impinging thereon, and outputs such fluorescent light emitted by the inorganic fluorescent compound to outside. The second phosphor 12 includes a structure including a fluorescent resin that binds the first phosphors 11 to one another, and emits fluorescent light to outside in response to radiation impinging thereon. Specifically, the second phosphor 12 includes the fluorescent resin that fixes relative positions of the first phosphors 11.

Radioactive rays are corpuscular rays emitted from a substance containing a radioactive element along with decay of the radioactive element, and, for example, may be one or more of alpha rays, beta rays, gamma rays, cosmic rays, and X-rays. Fluorescent light includes one or both of light emitted along with transition from a singlet excited state to a ground state and light emitted along with transition from a triplet excited state to a ground state, and, for example, may be one or more of visible light, ultraviolet light, and infrared light.

When the scintillator 10 is irradiated with radiation, the first phosphor 11 emits fluorescent light in response to radiation impinging thereon, and the second phosphor 12 also emits fluorescent light in response to radiation impinging thereon. Hence, luminance of light in each space between the first phosphors 11 is increased by the second phosphor 12 that binds the first phosphors 11 to one another, compared with a case where the scintillator is configured of the first phosphors 11 and a binding resin that emits no fluorescent light. As a result, luminance of light emitted by the scintillator 10 is increased.

For example, the first phosphor 11 may include the inorganic fluorescent compound that may be one of a sulfide phosphor, a germinate phosphor, a halide phosphor, a barium sulfate phosphor, a hafnium phosphate phosphor, a tantalite phosphor, a tungstate phosphor, a cerium-activated rare-earth silicate phosphor, a praseodymium-activated rare-earth oxysulfide phosphor, a terbium-activated rare-earth oxysulfide phosphor, a terbium-activated rare-earth phosphate phosphor, a terbium-activated rare-earth oxyhalide phosphor, a thulium-activated rare-earth oxyhalide phosphor, a europium-activated alkaline-earth phosphate phosphor, a europium-activated alkaline-earth fluorinated-halide phosphor, and a europium-activated alkaline-earth oxysulfide phosphor. It is to be noted that the first phosphor 11 may include the inorganic fluorescent compound that is a combination of two or more of the above-described phosphors.

For example, the sulfide phosphor may be one of ZnS:Ag, (Zn, Cd)S:Ag, (Zn, Cd)S:Cu, and (Zn, Cd)S:Cu, Al. Examples of the germinate phosphor may include $Bi_4Ge_3O_{12}$. For example, the halide phosphor may be one of CsI:Na, CsI:Tl, NaI, KI:Tl, CsBr:Tl, BaFI:Tl, BaF:Tl, LiI:Tl, RbBr:Tl, $CeBr_3$, $LaBr_3$:Ce. For example, the barium sulfate phosphor may be one of $BaSO_4$:Pb, $BaSO_4$:Eu, and (Ba, Sr)$SO_4$:Eu. Examples of the hafnium phosphate phosphor may include $HfP_2O_7$:Cu. For example, the tantalite phosphor may be one of $YTaO_4$, $YTaO_4$:Tm, $YTaO_4$:Nb, (Y, Sr)$TaO_{4-x}$:Nb, $LuTaO_4$, $LuTaO_4$:Nb, (Lu, Sr)$TaO_{4-x}$:Nb, $GdTaO_4$:Tm, and $Gd_2O_3/Ta_2O_5/B_2O_3$:Tb. For example, the tungstate phosphor may be one of $CaWO_4$, $MgWO_4$, $CaWO_4$:Pb, and $CdWO_4$.

Examples of the cerium-activated rare-earth silicate phosphor may include $Gd_2SiO_5$:Ce. For example, the praseodymium-activated rare-earth oxysulfide phosphor may be one of $Gd_2O_2S$:Pr and $Gd_2O_2S$:Pr, Ce, F. For example, the terbium-activated rare-earth oxysulfide phosphor may be one of $Y_2O_2S$:Tb, $Gd_2O_2S$:Tb, $La_2O_2S$:Tb, (Y, Gd)$_2O_2S$:Tb, and (Y, Gd)$O_2S$:Tb, Tm. For example, the terbium-activated rare-earth phosphate phosphor may be one of $YPO_4$:Tb, $GdPO_4$:Tb, and $LaPO_4$:Tb. The terbium-activated rare-earth oxyhalide phosphor may be one of: LaOBr:Tb; LaOBr:Tb, Tm; LaOCl:Tb; LaOCl:Tb, Tm; LaOBr:Tb; GdOBr:Tb; and GdOCl:Tb. For example, the thulium-activated rare-earth oxyhalide phosphor may be one of LaOBr:Tm and LaOCl:Tm.

For example, the europium-activated alkaline-earth phosphate phosphor may be one of $Ca_3(PO_4)_2$:Eu and $Ba_3(PO_4)_2$:Eu. For example, the europium-activated alkaline-earth fluorinated-halide phosphor may be one of: BaFCl:Eu; BaFBr:Eu; BaFCl:Eu, Tb; BaFBr:Eu, Tb; $BaF_2/BaCl_2/KCl$:Eu; and (Ba/Mg)$F_2/BaCl_2/KCl$:Eu. For example, the europium-activated alkaline-earth oxysulfide phosphor may be one of $Gd_2O_2S$:Eu and $Lu_2O_2S$:Eu.

The first phosphors 11 may be preferably configured of particles that are substantially evenly dispersed in the second phosphor 12. In the case where the first phosphors 11 are substantially evenly dispersed in the second phosphor 12, fluorescent light from each of the first phosphors 11 and the second phosphor 12 is evenly emitted from the entire scintillator 10, compared with a case where the first phosphors 11 are unevenly dispersed in the second phosphor 12. This results in suppression of unevenness in distribution of luminance of light emitted from the scintillator 10. In the case where the first phosphors 11 are configured of particles, it is substantially not necessary to perform shaping of the inorganic fluorescent compound. This suppresses limitations in processing on the inorganic fluorescent compound. The first phosphor 11 may include the inorganic fluorescent compound that is a deliquescent inorganic fluorescent compound. In the case where the first phosphors 11 are dispersed in the second phosphor 12, the first phosphors 11 are entirely covered with the second phosphor 12; hence, even if the inorganic fluorescent compound is a deliquescent inorganic fluorescent compound, variations in properties of the first phosphors 11 are suppressed.

The particle size of the first phosphor 11 may be preferably one nanometer to 100 micrometers both inclusive. The particle size of the first phosphor 11, however, may be less than one nanometer, or may be more than 100 micrometers. The luminance of light emitted from the scintillator 10 typically increases with each space between the first phosphors 11 being smaller. Hence, if the particle size of the first phosphor 11 is 100 micrometers or less, it is possible to allow the respective spaces between the first phosphors 11 to be made sufficiently small.

The second phosphor 12 includes the fluorescent resin that binds the first phosphors 11 to one another, and absorbs energy of radiation impinging on the second phosphor 12. The second phosphor 12 may include a structure including a fluorescent resin, or a structure including a composite containing a fluorescent resin and a compound other than the fluorescent resin.

The fluorescent resin includes a resin that is responsible for emission of fluorescent light by the second phosphor 12. Specifically, in the case where the fluorescent resin is configured of only a resin, the fluorescent resin serves as a phosphor that emits fluorescent light in response to radiation impinging thereon, and fluorescent light emitted from the resin corresponds to fluorescent light emitted from the fluorescent resin. In contrast, in the case where the fluorescent resin is configured of a composite containing a resin and one or both of additives, i.e., an organic fluorescent compound and a wavelength conversion compound, the resin contained in the fluorescent resin absorbs energy of radiation impinging thereon, and transfers the energy of radiation to the additives. In this case, fluorescent light is emitted from the fluorescent resin as a result of cooperation of the resin and the additive, and the resin contained in the fluorescent resin assists emission of the fluorescent light. It is to be noted that in the case where the fluorescent resin is configured of the composite, the resin contained in the fluorescent resin may be a phosphor.

For example, the second phosphor 12 may contain a resin and an organic fluorescent compound that converts the energy transferred from the resin into visible light. The second phosphor 12 may contain a resin and a wavelength conversion compound that converts the ultraviolet light emitted from the resin into visible light. The second phosphor 12 may contain a resin, an organic fluorescent compound that converts the energy transferred from the resin into ultraviolet light, and a wavelength conversion compound that converts the ultraviolet light emitted from the organic fluorescent compound into visible light. The second phosphor 12 may contain a resin, an organic fluorescent compound that converts the energy transferred from the resin into first visible light, and a wavelength conversion compound that converts the first visible light emitted from the organic fluorescent compound into second visible light different in wavelength from the first visible light.

For example, the resin may be any one of natural resin, synthetic resin, plastic, and elastomer. The resin may be any one of thermoplastic resin, thermosetting resin, photo-curable resin, and composite resin such as fiber-reinforced plastic. Examples of the resin to be used may include polystyrene, polyvinyl toluene, polyphenylbenzene, polyethylene terephthalate, and polyethylene naphthalate.

The resin may be preferably a thermoplastic resin. As the scintillator 10 has a more complicated shape according to demands, the second phosphor 12 also has a more complicated shape. If the resin is a thermoplastic resin, the second phosphor 12 may have certain fluidity for formation of the second phosphor 12. Hence, if the resin is a thermoplastic resin, the second phosphor 12 may be easily shaped even if the scintillator 10 has a complicated shape.

The organic fluorescent compound is an organic compound having a lower molecular weight than that of the resin, and is dispersed in the resin in a form of molecules. The organic fluorescent compound absorbs energy from the resin, and converts part of the absorbed energy into light to be emitted from the scintillator 10, or converts the energy emitted from the resin into light having wavelengths absorbable by the wavelength conversion compound. In the state where the organic fluorescent compound is dispersed in the resin in a form of molecules, the energy transfer and state transition of the organic fluorescent compound smoothly proceed before the state of the resin is transitioned.

Examples of the organic fluorescent compound to be used may include anthracene, p-terphenyl, p-quaterphenyl, 2,5-diphenyloxazol, 2,5-diphenyl-1,3,4-oxadiazole, naphthalene, diphenylacetylene, and stilbenzene.

The wavelength conversion compound is an organic compound having a molecular weight lower than that of the resin, and is dispersed in the resin in a form of molecules. The wavelength conversion compound absorbs energy from the resin, and converts part of the absorbed energy into light to be emitted from the scintillator 10, or converts the fluorescent light emitted from the organic fluorescent compound into light to be emitted from the scintillator 10. In the state where the wavelength conversion compound is dispersed in the resin in a form of molecules, transition of the wavelength conversion compound smoothly proceed. Examples of the wavelength conversion compound to be used may include 2,2-p-phenylenebis(5-phenyloxazol).

The wavelength band of fluorescent light emitted from the first phosphor 11 may have wavelengths different from those of the wavelength band of fluorescent light emitted from the second phosphor 12. Specifically, the first phosphor 11 may emit fluorescent light in a first wavelength band, while the second phosphor 12 emits fluorescent light in a second wavelength band different from the first wavelength band. While a photoelectric conversion substance that converts light into electric charge is used in a detection section that detects light emitted from the scintillator 10, such a photoelectric conversion substance may have a quantum efficiency varying depending on wavelengths of light, i.e., may have a sensitivity varying depending on wavelength of light. In the case where the wavelength band of fluorescent light emitted from the first phosphor 11 has wavelengths different from those of the wavelength band of fluorescent light emitted from the second phosphor 12, each of the two wavelength bands may be preferably set to be a wavelength band in which the photoelectric conversion substance has a relatively high sensitivity.

In the case where an overlapping band, in which the wavelength band of fluorescent light emitted from the second phosphor 12 overlaps with the wavelength band of fluorescent light emitted from the first phosphor 11, exists, the scintillator 10 emits light with higher luminance in the overlapping band than in other wavelength bands. In such a case, when the overlapping band contains a detection wavelength, radiation detection accuracy is improved. In particular, if the photoelectric conversion substance has high detection sensitivity in the overlapping band, it is effective that the wavelength band of fluorescent light emitted from the second phosphor 12 overlaps with the wavelength band of fluorescent light emitted from the first phosphor 11.

(Method of Manufacturing Scintillator)

A method of manufacturing the scintillator 10 is now described with reference to FIG. 2. As illustrated in FIG. 2, the scintillator 10 is manufactured through preparation of a fluid material (step S11), preparation of a mixture (step S12), and curing of the fluid material (step S13).

In the preparation of the fluid material (step S11), a material for forming the second phosphor 12 is prepared in a form of a fluid material. The fluid material may be configured of one of a melt prepared by heating a resin that is to be contained in the second phosphor 12, a precursor composite of the resin that is to be contained in the second phosphor 12, a melt prepared by heating the second phosphor 12, and a precursor composite of the second phosphor 12. The fluid material may be formed as either a liquid or a suspension, and the suspension may be either a sol in which colloidal particles are dispersed or a liquid in which solid particles larger than the colloidal particles are dispersed.

If the resin contained in the second phosphor 12 is a thermoplastic resin, the fluid material is prepared through heating of the thermoplastic resin. If the resin contained in the second phosphor 12 is a thermosetting resin or a photocurable resin, the fluid material is prepared through formation of a precursor composite of the resin that is to be contained in the second phosphor 12.

In the preparation of the mixture (step S12), the fluid material is mixed with the first phosphors 11. To disperse the first phosphors 11 in the second phosphor 12, it is preferable that the fluid material be stirred after the first phosphors 1 are added to the fluid material, or the first phosphors 11 be added to the fluid material being stirred. The fluid material may be mixed with the first phosphors 11 through filling the spaces between the first phosphors 11 with the fluid material. In the preparation of the mixture, the organic fluorescent compound and the wavelength conversion compound may be added to the mixture containing the fluid material and the first phosphors 11, or the first phosphors 11 may be added to the fluid material containing the organic phosphor compound and the wavelength conversion compound.

If the resin contained in the second phosphor 12 is a thermoplastic resin, the organic phosphor compound and/or the wavelength conversion compound are/is added to a monomolecular, fluid precursor composite for the thermoplastic resin. The first phosphors 11 may be mixed to such a precursor composite for the resin. Alternatively, if the resin contained in the second phosphor 12 is a thermoplastic resin, the organic phosphor compound and/or the wavelength conversion compound may also be added to the precursor composite to form a pellet of the thermoplastic resin containing the resin, the organic phosphor compound, and the wavelength conversion compound. Then, the first phosphors 11 may be added to the fluid material in which the pellet of the thermoplastic resin is dissolved.

In the curing of the fluid material (step S13), the fluid material contained in the mixture is cured. If the resin contained in the second phosphor 12 is a thermoplastic resin, for example, the mixture may be supplied into an extrusion molding die or an injection molding die, so that the fluid material is cooled to a temperature lower than the glass transition temperature of the fluid material. Consequently, the fluid material is cured into a shape in accordance with the shape of the plate-like die.

If the resin contained in the second phosphor 12 is a thermosetting resin, the fluid material is heated to a temperature equal to or higher than the polymerization initiation temperature of the precursor composite. As a result, the fluid material is cured, so that the first phosphors 11 are bound to one another by the resin. If the resin contained in the second phosphor 12 is a photo-curable resin, the fluid material is irradiated with light that initiates polymerization of the precursor composite. As a result, the fluid material is cured, so that the first phosphors 11 are bound to one another by the resin.

(Radiation Detection Section)

The radiation detection section in the radiation detection unit is now described with reference to FIG. 3. It is however possible to configure the radiation detection unit by the radiation detection section itself.

As illustrated in FIG. 3, the radiation detection section 20 includes a connected body configured of the scintillator 10 and the photoelectric conversion component 21 connectively disposed under the scintillator 10. The photoelectric conversion component 21 converts the light emitted from the scintillator 10 into electric signals. The radiation detection section 20 includes a reflection component 22 that reflects light emitted from the scintillator 10.

For example, the photoelectric conversion component 21 may be implemented by a switch substrate attached to the scintillator 10. The switch substrate includes a plurality of switch elements disposed in a matrix, where each of the switch elements includes a photoelectric conversion layer. The photoelectric conversion layer in each of the switch elements converts light emitted from the scintillator 10 into electric charge corresponding to luminance of the light. Each of the switch elements is turned into an ON or OFF state depending on the electric charge resulted from the conversion by the photoelectric conversion layer.

When the scintillator 10 is partially irradiated with radiation, fluorescent light is emitted from the portion irradiated with the radiation, and the emitted fluorescent light is converted into electric charge by the photoelectric conversion layer. A switch element corresponding to the portion irradiated with radiation is turned in state thereof, which in turn results in detection of irradiation of radiation, and additionally results in detection of irradiation of radiation to the portion corresponding to the switch element turned in its state.

The photoelectric conversion layer may be formed of an inorganic material such as amorphous silicon, single-crystal silicon, amorphous selenium, and CdS—CdSe, or an organic material such as quinacridone compounds and phthalocyanine compounds. It is to be noted that the component that converts light emitted from the scintillator 10 into electric charge is not limited to the photoelectric conversion layer, but may be a photomultiplier.

The reflection component 22 reflects light, which is emitted from the scintillator 10 to the reflection component 22, toward the photoelectric conversion component 21. Examples of formation materials of the reflection component 22 may include metal films such as aluminum, silver, nickel, and titanium films. The reflection component 22 may be a resin film formed through dispersion of light-scattering particles such as titanium oxide, aluminum oxide, and silicon oxide particles. The reflection component 22 may be directly attached to the scintillator 10, or may be attached to the scintillator 10 by an adhesive or a gluing agent including epoxy resin or the like.

The reflection component 22 may preferably have a function of protecting the scintillator 10 from a physical or chemical stimulus. For example, the reflection component 22 may preferably include a protective layer formed on a surface opposite to a surface to be attached to the scintillator 10. The protective layer is configured of a polymer compound that transmits radiation. A formation material of the protective layer may be any one of polyurethane, vinyl chloride copolymer, vinyl chloride-vinyl acetate copolymer, vinyl chloride-vinylidene chloride copolymer, vinyl chloride-acrylonitrile copolymer, butadiene-acrylonitrile copolymer, polyamide resin, polyvinyl butyral, polyester, cellulose derivatives, polyimide, polyamide, poly paraxylene, styrenebutadiene copolymer, synthesized rubber resin, phenol resin, epoxy resin, urea resin, melamine resin, phenoxy resin, silicon resin, acrylic resin, and urea formamide resin.

A ratio of the number of photons entering the photoelectric conversion component 21 to the number of electric charges generated by the photoelectric conversion component 21 is set as quantum efficiency. The quantum efficiency of the photoelectric conversion component 21 may vary depending on wavelengths of fluorescent light applied to the photoelectric conversion component 21. Specifically, the detection sensitivity for fluorescent light of the photoelectric conversion component 21 may vary depending on wavelengths of fluorescent light from the scintillator 10. Hence, it is preferable that wavelengths of fluorescent light emitted from the first phosphor 11 and wavelengths of fluorescent light emitted from the second phosphor 12 be contained in the absorption wavelength band of the photoelectric conversion component 21, and besides, be contained in a certain wavelength band, in which the detection sensitivity is relatively high, in the absorption wavelength band.

In production of the radiation detection section 20, the scintillator 10 may be first formed and then attached to the photoelectric conversion component 21, or the fluid material may be coated onto the photoelectric conversion component 21 to form the scintillator 10. In the case where the scintillator 10 is attached to the photoelectric conversion component 21, the method of manufacturing the scintillator 10 is not limited by the heatproof temperature of the photoelectric conversion component 21, etc. This increases the degree of freedom of the method of manufacturing the scintillator 10, and in turn increases the degree of freedom of the formation material of the scintillator 10. On the other hand, in the case where the scintillator 10 is formed on the photoelectric conversion component 21, operation of attaching the scintillator 10 to the photoelectric conversion component 21 is omitted.

(Radiation Detection Unit)

The radiation detection unit is now described with reference to FIG. 4. As illustrated in FIG. 4, the radiation detection unit 30 includes a radiation image pickup unit 31 incorporating the radiation detection section 20, and a radiation irradiation unit 32 that applies radiation to the radiation image pickup unit 31. The radiation image pickup unit 31 is connected to an image pickup control unit 33 that controls the radiation image pickup unit 31, and the image pickup control unit 33 is connected to a display unit 34 that displays image pickup results.

The radiation irradiation unit 32 includes a source of radiation, and a collimator that limits the irradiation range of radiation to a predetermined range. The radiation irradiation unit 32 applies radiation 31R output through the collimator to the radiation image pickup unit 31.

The image pickup control unit 33 executes an image pickup program for capturing a radiation image. The image pickup control unit 33 generates control signals according to the image pickup program, and controls the radiation image pickup unit 31 through outputting the control signals to the radiation image pickup unit 31. The image pickup control unit 33 generates display data using image pickup data received from the radiation image pickup unit 31, and controls the display unit 34 through outputting the display data to the display unit 34.

The radiation image pickup unit 31 receives the control signals from the image pickup control unit 33, and generates drive signals for driving the radiation detection section 20 to drive the radiation detection section 20. The radiation image pickup unit 31 generates the image pickup data using radiation detection results by the radiation detection section 20, and outputs the image pickup data to the image pickup control unit 33. A radiation irradiation object M is disposed between the radiation irradiation unit 32 and the radiation image pickup unit 31. The radiation irradiation object M may be a human body or an article. The image of the radiation irradiation object M may be entirely or partially captured by the radiation image pickup unit 31. The radiation detection section 20 is incorporated in the radiation image pickup unit 31 in such a manner that the scintillator 10 is disposed between the radiation irradiation object M and the photoelectric conversion component 21.

In the irradiation of radiation by the radiation irradiation unit 32, a part of the radiation is transmitted by the radiation irradiation object M and then applied to the radiation detection section 20, while another part of radiation is directly applied to the radiation detection section 20. The radiation detection section 20 outputs detection results corresponding to the portion irradiated with the radiation in the scintillator 10. The radiation image pickup unit 31 generates the image pickup data based on the detection results by the radiation detection section 20, and outputs the image pickup data to the image pickup control unit 33. The image pickup control unit 33 generates the display data based on the image pickup data and outputs the display data to the display unit 34 so that the display unit 34 displays an image corresponding to the portion irradiated with the radiation in the scintillator 10. Consequently, the radiation detection unit 30 outputs, as a visible image, the radiation image formed by radiation transmitted by the radiation irradiation object M.

The scintillator 10 incorporated in the radiation irradiation unit 32 is formed of the first phosphors 11 and the second phosphor 12. As a result, in the radiation detection unit 30, in order to obtain luminance of light same as the luminance of light of a case where the scintillator is formed of the first phosphors 11 and a binding resin emitting no light, the radiation irradiation unit 32 may emit a smaller dose of radiation than that of the case where the scintillator is formed of the first phosphors 11 and the binding resin emitting no light. This makes it possible to decrease the dose of radiation applied to the radiation irradiation object M. Hence, in the case where the radiation irradiation object M is a human body, the radiation irradiation object M is exposed to a smaller amount of radiation.

EXAMPLES 1 AND 2

Examples 1 and 2 of the scintillator are now described with reference to FIGS. 5 and 6 and Table 1.

$Gd_2O_2S$:Tb was used as the first phosphor 11, and a composite was used as the second phosphor 12, the composite containing polyvinyl toluene as a main component and containing an organic fluorescent compound and a wavelength conversion compound. The second phosphor 12 was heated and thus a fluid material was prepared, and then a mixture was prepared by adding the first phosphors 11 to the fluid material. The second phosphor 12 contained in the mixture was cured, so that a plate-like scintillator 10 was produced as Example 1. The scintillator of the Example 1 was irradiated with X-rays to measure the luminance and emission spectrum of light emitted from the scintillator of the Example 1. FIG. 5 illustrates the emission spectrum of light emitted from the scintillator of the Example 1. Table 1 shows luminance of light emitted from the scintillator of the Example 1.

$Gd_2O_2S$:Tb was used as the first phosphor 11, and polyethylene naphthalate was used as the second phosphor 12. The second phosphor 12 was heated and thus a fluid material was prepared, and then a mixture was prepared by adding the first phosphors 11 to the fluid material. The fluid, second phosphor 12 contained in the mixture was then cured, so that a plate-like scintillator 10 was produced as Example 2. The scintillator of the Example 2 was irradiated with X-rays to measure the luminance of light emitted from the scintillator of the Example 2. Table 1 further shows luminance of light emitted from the scintillator of the Example 2.

$Gd_2O_2S$:Tb was used as the first phosphor 11, and polycarbonate as a resin emitting no fluorescent light was used as a binding resin for the first phosphors 11, so that a plate-like scintillator was produced as comparative example 1. The scintillator of the comparative example 1 was irradiated with X-rays to measure the emission spectrum of light emitted from the scintillator of the comparative example 1. FIG. 6 illustrates the emission spectrum of light emitted from the scintillator of the comparative example 1. Table 1 further shows luminance of light emitted from the scintillator of the comparative example 1.

As illustrated in FIG. 6, the comparative example 1 showed a first emission peak P1, a second emission peak P2, a third emission peak P3, a fourth emission peak P4, a sixth emission peak P6, and a seventh emission peak P7. It was found that the respective wavelength bands of the first emission peak P1 to the fourth emission peak P4 were similar to those in the Example 1. It was therefore found that the respective emission peaks of the first emission peak P1 to the fourth emission peak P4 were attributed to light from a substance common to the Example 1 and the comparative example 1, i.e., emission peaks attributed to fluorescent light emitted from the first phosphors 11. The wavelength band of the sixth emission peak P6 was 430 nm to 450 nm both inclusive, and the wavelength band of the seventh emission peak P7 was 405 nm to 420 nm both inclusive. Although each of the sixth emission peak P6 and the seventh emission peak P7 had a spectrum pattern different from that of a fifth emission peak P5 of the Example 1, the wavelength band of each of the emission peaks P6 and P7 was contained in the wavelength band of the fifth emission peak P5 of the Example 1. It was therefore found that the sixth emission peak P6 and the seventh emission peak P7 were also emission peaks attributed to fluorescent light emitted from the first phosphors 11.

On the other hand, as illustrated by a broken line in FIG. 5, the fifth emission peak P5 of the Example 1 contained a broad emission peak Pn that was different from the sixth emission peak P6 and from the seventh emission peak P7, and had a wavelength band of 380 nm to 480 nm both inclusive. Such a broad emission peak Pn was attributed to fluorescent light emitted from a phosphor other than the first phosphor 11, i.e., fluorescent light emitted from the second phosphor 12. It was therefore found that using the composite, which contained polyvinyl toluene as a main component and contained the organic fluorescent compound and the wavelength conversion compound, as the second phosphor 12 increases luminance of light in the wavelength band of 380 nm to 480 nm both inclusive.

TABLE 1

| | First phosphor | Second phosphor | Luminance (%) |
|---|---|---|---|
| Example 1 | $Gd_2O_2S$:Tb | Polyvinyl toluene | 130 |
| Example 2 | $Gd_2O_2S$:Tb | Polyethylene naphthalate | 135 |
| Comparative example 1 | $Gd_2O_2S$:Tb | Polycarbonate | 100 |

As shown in Table 1, it was found that the luminance of light of 130% was obtained from the scintillator of the Example 1, and the luminance of light of 135% was obtained from the scintillator of the Example 2, each luminance being higher than that in the comparative example 1. It was thus found that binding the first phosphors 11 to one another by the second phosphor 12 increases luminance of light emitted from the scintillator.

EXAMPLES 3 AND 4

Examples 3 and 4 of the scintillator are now described with reference to FIGS. 7 and 8 and Table 2.

ZnS:Ag was used as the first phosphor 11, and a composite was used as the second phosphor 12, the composite containing polyvinyl toluene as a main component and containing an organic fluorescent compound and a wavelength conversion compound. The second phosphor 12 was heated and thus a fluid material was prepared, and then a mixture was prepared by adding the first phosphors 11 to the fluid material. The second phosphor 12 contained in the mixture was cured, so that a plate-like scintillator 10 was produced as Example 3. The scintillator of the Example 3 was irradiated with X-rays to measure the emission spectrum and luminance of light emitted from the scintillator of the Example 3. FIG. 7 illustrates the emission spectrum of light emitted from the scintillator of the Example 3. Table 2 shows luminance of light emitted from the scintillator of the Example 3.

ZnS:Ag was used as the first phosphor 11, and polyethylene naphthalate was used as the second phosphor 12. The second phosphor 12 was heated and thus a fluid material was prepared, and then a mixture was prepared by adding the first phosphors 11 to the fluid material. The fluid, second phosphor 12 contained in the mixture was then cured, so that a plate-like scintillator 10 was produced as Example 4. The scintillator of the Example 4 was irradiated with X-rays to measure the luminance of light emitted from the scintillator of the Example 4. Table 2 further shows luminance of light emitted from the scintillator of the Example 4.

ZnS:Ag was used as the first phosphor 11, and polycarbonate as a resin emitting no fluorescent light was used as a binding resin for the first phosphors 11, so that a plate-like scintillator was produced as comparative example 2. The scintillator of the comparative example 2 was irradiated with X-rays to measure the emission spectrum of light emitted from the scintillator of the comparative example 2. FIG. 8 illustrates the emission spectrum of light emitted from the scintillator of the comparative example 2. Table 2 further shows luminance of light emitted from the scintillator of the comparative example 2.

As illustrated in FIG. 7, the Example 3 showed an emission peak Pa in a wavelength band of 380 nm to 530 nm both inclusive. As illustrated in FIG. 8, the comparative example 2 showed an emission peak Pb in a wavelength band of 400 nm to 530 nm both inclusive. The wavelength band of the emission peak Pb of the comparative example 2 was 400 nm to 530 nm both inclusive, which was contained in the wavelength band of the emission peak Pa of the Example 3. Hence, the light having the wavelength band of 400 nm to 530 nm both inclusive was attributed to fluorescent light emitted from ZnS:Ag as the first phosphor 11.

On the other hand, the emission peak Pa of the Example 3 contained an emission peak Pn that was different from the emission peak Pb of the comparative example 2, and had a wavelength band of 380 nm to 420 nm both inclusive. The emission peak Pn was attributed to fluorescent light emitted from a phosphor other than the first phosphor 11, i.e., fluorescent light emitted from the second phosphor 12. It was therefore found that using the composite, which contained polyvinyl toluene as a main component and contained the organic fluorescent compound and the wavelength conversion compound, as the second phosphor 12 increases luminance of light in the wavelength band of 380 nm to 420 nm both inclusive.

TABLE 2

| | First phosphor | Second phosphor | Luminance (%) |
|---|---|---|---|
| Example 3 | ZnS:Ag | Polyvinyl toluene | 180 |
| Example 4 | ZnS:Ag | Polyethylene naphthalate | 195 |
| Comparative example 2 | ZnS:Ag | Polycarbonate | 100 |

As shown in Table 2, it was found that the luminance of light of 180% was obtained from the scintillator of the Example 3, and the luminance of light of 195% was obtained from the scintillator of the Example 4, each luminance being higher than that of the comparative example 2. It was thus found that binding the first phosphors 11 to one another by the second phosphor 12 increases luminance of light emitted from the scintillator.

(Absorption Spectrum of Photoelectric Conversion Component)

An exemplary absorption spectrum of the photoelectric conversion component 21 is now described with reference to FIG. 9.

A single-crystal silicon layer was used as a photoelectric conversion layer contained in the photoelectric conversion component 21. The photoelectric conversion component 21 was irradiated with light having a wavelength band of 380 nm to 780 nm both inclusive to measure a quantum efficiency at each wavelength of the photoelectric conversion component 21.

As illustrated in FIG. 9, the photoelectric conversion component 21 absorbed light having a wavelength band of 380 nm to 780 nm both inclusive, and converted the absorbed light into electric charge. It was found that the quantum efficiency of the photoelectric conversion component 21 was highest for light having a wavelength band of 380 nm to 480 nm both inclusive, while being decreased with the wavelength longer than 480 nm. It was also found that the quantum efficiency of the photoelectric conversion component 21 was 60% or more for the light having a wavelength band of 380 nm to 780 nm both inclusive.

Each of the scintillators of the Examples 1 and 2 improves luminance of light having a wavelength band of 380 nm to 480 nm both inclusive. Each of the scintillators of the Examples 3 and 4 improves luminance of light having a wavelength band of 380 nm to 420 nm both inclusive. On the other hand, the photoelectric conversion component 21 has a detection sensitivity that is relatively high for light having a wavelength band of 380 nm to 480 nm both inclusive. Hence, if the radiation detection section 20 includes one of the scintillators of the Examples 1 to 4 and the photoelectric conversion component 21 with the single-crystal silicon layer as the photoelectric conversion layer, the detection sensitivity of the radiation detection section 20 is particularly improved.

According to the above-described embodiment, at least the following effects are obtained.

Fluorescent light is emitted from the second phosphor 12 located between the first phosphors 11. Hence, luminance of light emitted from the scintillator 10 is increased by the second phosphor 12 binding the first phosphors 11 to one another.

The first phosphors 11 are configured of particles dispersed in the second phosphor 12, which suppresses unevenness in distribution of luminance of light emitted from the scintillator 10.

The first phosphors 11 are configured of particles, which suppresses limitations in processing on the inorganic fluorescent compound.

The first phosphors 11 are entirely covered with the second phosphor 12, which suppresses variations in properties of the first phosphors 11 due to exposure to the air.

The binding resin is a thermoplastic resin. Hence, during formation of the second phosphor 12, the second phosphor 12 is heated to have fluidity, and thus enters the spaces between the first phosphors 11.

Since the organic fluorescent compound is dispersed in the binding resin in a form of molecules, energy of radiation absorbed by the binding resin is used for emission of fluorescent light by the organic fluorescent compound.

Since the wavelength conversion compound is dispersed in the binding resin in a form of molecules, wavelength conversion by the wavelength conversion compound uniformly proceeds over the entire scintillator 10.

Since the wavelength band of the fluorescent light emitted from the first phosphor 11 has wavelengths different from those of the fluorescent light emitted from the second phosphor 12, the wavelength band of light emitted from the scintillator 10 is likely to contain a wavelength at which detection sensitivity is high.

The wavelength band of light attributed to the fluorescent light emitted from the second phosphor 12 is within a visible range, and the wavelength at which the photoelectric conversion component 21 has the highest quantum efficiency is also within a visible range. The detection sensitivity of the radiation detection section 20 is therefore particularly improved.

Modifications of the scintillator 10 are now described.

(First Modification)

As illustrated in FIG. 10, the scintillator 10 includes a first light-emitting section L1 which is layered and a second light-emitting section L2 which is layered. The second light-emitting section L2 is overlaid on the first light-emitting section L1. The thickness of the first light-emitting section L1 may be equal to or different from the second light-emitting section L2 in a direction where the second light-emitting section L2 is overlaid on the first light-emitting section L1.

The first light-emitting section L1 includes a plurality of first phosphors 11a, and second phosphor 12a binding the first phosphors 11a to one another. The second light-emitting section L2 includes a plurality of first phosphors 11b, and second phosphor 12b binding the first phosphors 11b to one another.

Each of the first phosphors 11a and 11b includes a structure including an inorganic fluorescent compound that emits fluorescent light in response to radiation impinging thereon, and outputs such fluorescent light emitted by the inorganic fluorescent compound to outside. Each of the first phosphors 11a and 11b is one of the above-described inorganic fluorescent compounds. The respective first phosphors 11a and 11b include such inorganic fluorescent compounds that may be different from each other in one or more of a composition, a shape, and size.

The second phosphor 12a includes a structure including a resin that binds the first phosphors 11a to one another, and emits fluorescent light to outside in response to radiation impinging thereon. The second phosphor 12b includes a structure including a resin that binds the first phosphors 11b to one another, and emits fluorescent light to outside in response to radiation impinging thereon. The resin contained in the second phosphor 12a and the resin contained in the second phosphor 12b are each one of the above-described resins, and are different from each other in one or both of a structural unit and the mean molecular weight. In the case where the second phosphors 12a and 12b are each configured of a composite, the second phosphors 12a and 12b may contain the organic fluorescent compounds that are equal to or different from each other, and the wavelength conversion compounds equal to or different from each other.

The density of the first phosphors 11a in the first light-emitting section L1 may be higher or lower than the density of the first phosphors 11b in the second light-emitting section L2.

The first light-emitting section L1 and the second light-emitting section L2 are laminated to each other. Hence, for example, a slight amount of radiation transmitted by the first light-emitting section L1 is converted into fluorescent light by the second light-emitting section L2, or a slight amount of radiation transmitted by the second light-emitting section L2 is converted into fluorescent light by the first light-emitting section L1.

In the case where the wavelength band of light emitted from the first light-emitting section L1 is different from the wavelength band of light emitted from the second light-emitting section L2, the photoelectric conversion component 21 used for one scintillator 10 is improved in diversity.

(Second Modification)

As illustrated in FIG. 11, the scintillator 10 includes a first composite 11L1 as a first phosphor, a second composite 11L2 as a first phosphor, and a second phosphor 12 that binds between the first composite 11L1 and the second composite 11L2.

The first composite 11L1 includes phosphor particles L1a each including an inorganic fluorescent compound, and a non-light-emitting resin R1 binding the phosphor particles L1a together. The non-light-emitting resin R1 transmits fluorescent light emitted from the phosphor particles L1a, fluorescent light emitted from the second phosphor 12, and radiation. The second composite 11L2 includes phosphor particles L1b each including an inorganic fluorescent compound, and a non-light-emitting resin R2 binding the phosphor particles L1b together. The non-light-emitting resin R2 transmits fluorescent light emitted from the phosphor particles L1b, fluorescent light emitted from the second phosphor 12, and radiation.

The inorganic fluorescent compounds contained in the respective phosphor particles L1a and L1b are each one of the above-described inorganic fluorescent compounds, and may be different from each other in one or more of a composition, a shape, and size. The non-light-emitting resins R1 and R2 may be equal to or different from each other in one or more of a structural unit, the mean molecular weight, and distribution of molecular weight.

The second phosphor 12 contains a resin that binds the first composite 11L1 to the second composite 11L2. The resin contained in the second phosphor 12 is one or more of the above-described resins, and is responsible for light emission of the second phosphor 12. The second phosphor 12 may entirely or partly fill the space between the first composite 11L1 and the second composite 11L2.

Furthermore, the technology encompasses any possible combination of some or all of the various embodiments described herein and incorporated herein.

It is possible to achieve at least the following configurations from the above-described example embodiments of the disclosure.

(1) A scintillator, including:
first phosphors each including an inorganic fluorescent compound; and
a second phosphor including a fluorescent resin.

(2) The scintillator according to (1), wherein the first phosphors are dispersed in the fluorescent resin.

(3) The scintillator according to (1) or (2), wherein the fluorescent resin includes a resin and an organic fluorescent compound.

(4) The scintillator according to any one of (1) to (3), wherein the second phosphor includes a wavelength conversion compound.

(5) The scintillator according to any one of (1) to (4), wherein the fluorescent resin is a thermoplastic resin.

(6) The scintillator according to any one of (1) to (5), wherein the first phosphors emit fluorescent light in a first wavelength band, and the second phosphor emits fluorescent light in a second wavelength band that is different from the first wavelength band.

(7) A radiation detection unit, including:
a scintillator including first phosphors and a second phosphor, the first phosphors each including an inorganic fluorescent compound, and the second phosphor including a fluorescent resin; and
a photoelectric conversion component.

(8) The radiation detection unit according to (7), wherein the photoelectric conversion component includes single crystal silicon.

(9) The radiation detection unit according to (7) or (8), wherein the photoelectric conversion component has a sensitivity at an emission wavelength of the first phosphors and at an emission wavelength of the second phosphor.

(10) The radiation detection unit according to any one of (7) to (9), further including a radiation irradiation section.

(11) A method of manufacturing a scintillator, the method including:
mixing first phosphors with a second phosphor, the first phosphors each including an inorganic fluorescent compound, and the second phosphor including a fluorescent resin; and
curing the second phosphor.

(12) The method of manufacturing the scintillator according to (11), wherein the second phosphor includes a thermoplastic resin.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 Scintillator
11 First phosphor
11a First phosphor
11b First phosphor
11L1 First composite
11L2 Second composite
12 Second phosphor
12a Second phosphor
12b Second phosphor
20 Radiation detection section
21 Photoelectric conversion component
22 Reflection component
30 Radiation detection unit
31 Radiation image pickup unit
31R Radiation
32 Radiation irradiation unit
33 Image pickup control unit
34 Display unit
L1 First light-emitting section
L2 Second light-emitting section
L1a Phosphor particle
L1b Phosphor particle
M Irradiation object
R1 Non-light-emitting resin
R2 Non-light-emitting resin

The invention claimed is:

1. A scintillator, comprising:
a first light-emitting section that includes a plurality of first phosphors and a plurality of second phosphors that binds the plurality of first phosphors; and
a second light-emitting section overlaid on the first light-emitting section, wherein the second light-emitting section includes a plurality of third phosphors and a plurality of fourth phosphors that binds the plurality of third phosphors,
wherein
the plurality of first phosphors further includes a plurality of first inorganic fluorescent compounds and the plurality of third phosphors further includes a plurality of second inorganic fluorescent compounds, and
the plurality of second phosphors includes a first resin to absorb energy of radiation impinging thereupon, a first organic fluorescent compound to convert the energy of radiation into a first visible light, and a first wavelength conversion compound to convert the first visible light into a second visible light, wherein the second visible light is different in wavelength from that of the first visible light.

2. The scintillator according to claim 1, wherein the plurality of fourth phosphors includes a second resin and a second organic fluorescent compound.

3. The scintillator according to claim 2, wherein the first resin and the second resin are thermoplastic resins.

4. The scintillator according to claim 1, wherein the second phosphor further includes a second wavelength conversion compound.

5. The scintillator according to claim 1, wherein the plurality of first phosphors and the plurality of third phosphors are configured to emit fluorescent light in different first wavelength bands, and
the plurality of second phosphor and the plurality of fourth phosphors are configured to emit fluorescent light in different second wavelength bands that are further different from the first wavelength bands.

6. The scintillator according to claim 5, wherein the scintillator is configured to emit higher luminance in wavelength bands that include an overlap of the first wavelength bands and the second wavelength bands.

7. The scintillator according to claim 1, wherein density of the plurality of first phosphors in the first light-emitting section is different from density of the plurality of third phosphors in the second light-emitting section.

8. The scintillator according to claim 1, wherein the plurality of first phosphors and the plurality of third phosphors differ from each other with respect to the plurality of first inorganic fluorescent compounds and the plurality of second inorganic fluorescent compounds included in the plurality of first phosphors and the plurality of third phosphors, respectively based at least on composition, shape or size.

9. The scintillator according to claim 1, wherein a first radiation transmitted by the first light-emitting section is converted into fluorescent light by the second light-emitting section, and a second radiation transmitted by the second light-emitting section is converted into fluorescent light by the first light-emitting section.

10. The scintillator according to claim 1, wherein the plurality of second phosphors and the plurality of fourth phosphors differ from each other with respect to fluorescent resins included in the plurality of second phosphors and the plurality of fourth phosphors, based on one or both of: a structural unit and molecular weight.

11. A radiation detection unit, comprising:
a scintillator that includes:
a first light-emitting section and a second light-emitting section overlaid on the first light-emitting section, wherein
the first light-emitting section includes a plurality of first phosphors and a plurality of second phosphors that binds the plurality of first phosphors, and
the second light-emitting section includes a plurality of third phosphors and a plurality of fourth phosphors that binds the plurality of third phosphors,
wherein
the plurality of first phosphors further includes a plurality of first inorganic fluorescent compounds and the plurality of third phosphors further includes a plurality of second inorganic fluorescent compounds, and
the plurality of second phosphors includes a first resin to absorb energy of radiation impinging thereupon, a first organic fluorescent compound to convert a the energy of radiation into a first visible light, and a first wavelength conversion compound to convert the first visible light into a second visible light, wherein the second visible light is different in wavelength from that of the first visible light; and
a photoelectric conversion component.

12. The radiation detection unit according to claim 11, wherein the photoelectric conversion component includes single crystal silicon.

13. The radiation detection unit according to claim 11, wherein the photoelectric conversion component has sensitivities at emission wavelengths of the plurality of first phosphors, the plurality of second phosphors, the plurality of third phosphors, and the plurality of fourth phosphors.

14. The radiation detection unit according to claim 11, further comprising a radiation irradiation section.

15. A method of manufacturing a scintillator, comprising:
mixing a plurality of first phosphors with a plurality of second phosphors in a first light-emitting section, and a plurality of third phosphors with a plurality of fourth phosphors in a second light-emitting section,
wherein the second light-emitting section is overlaid on the first light-emitting section,
wherein the plurality of second phosphors binds the plurality of first phosphors and the plurality of third phosphors binds the plurality of fourth phosphors,
wherein the plurality of first phosphors further includes a plurality of first inorganic fluorescent compounds and the plurality of third phosphors further includes a plurality of second inorganic fluorescent compounds, and
wherein the plurality of second phosphors includes a first resin to absorb energy of radiation impinging thereupon, a first organic fluorescent compound to convert the energy of radiation into a first visible light, and a first wavelength conversion compound to convert the first visible light into a second visible light, wherein the second visible light is different in wavelength from that of the first visible light; and curing the plurality of second phosphors and the plurality of fourth phosphors.

16. The method of manufacturing the scintillator according to claim 15, wherein the plurality of second phosphors and the plurality of fourth phosphors differ from each other with respect to thermoplastic resins included in the plurality of second phosphors and the plurality of fourth phosphors.

17. A scintillator, comprising:

a first composite that includes a first plurality of phosphor particles, wherein each particle of the first plurality of phosphor particles includes a first inorganic fluorescent compound and a first resin that binds the first plurality of phosphor particles;

a second composite that includes a second plurality of phosphor particles, wherein each particle of the second plurality of phosphor particles includes a second inorganic fluorescent compound and a second resin that binds the second plurality of phosphor particles, wherein the first plurality of phosphor particles and the second plurality of phosphor particles differ from each other with respect to the first inorganic fluorescent compound and the second inorganic fluorescent compounds contained therein, respectively; and a second phosphor that binds the first composite and the second composite wherein the second phosphor includes a resin to absorb energy of radiation impinging thereupon, an organic fluorescent compound to convert the energy of radiation into a first visible light, and a wavelength conversion compound to convert the first visible light into a second visible light, wherein the second visible light is different in wavelength from that of the first visible light.

18. The scintillator according to claim 17, wherein the first plurality of phosphor particles are different from the second plurality of phosphor particles with respect to the first inorganic fluorescent compound and the second inorganic fluorescent compound based on at least composition, shape or size.

19. The scintillator according to claim 17, wherein the first resin is different from the second resin based on at least a structural unit, mean molecular weight or distribution of molecular weight.

* * * * *